(12) United States Patent
Li

(10) Patent No.: US 11,561,427 B2
(45) Date of Patent: Jan. 24, 2023

(54) 3D LIQUID CRYSTAL DISPLAY PANEL, DISPLAY DEVICE AND DRIVING METHOD

(71) Applicant: BOE TECHNOLOGY GROUP CO., LTD., Beijing (CN)

(72) Inventor: Zhongxiao Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 678 days.

(21) Appl. No.: 16/397,977

(22) Filed: Apr. 29, 2019

(65) Prior Publication Data

US 2020/0064679 A1   Feb. 27, 2020

(30) Foreign Application Priority Data

Aug. 21, 2018  (CN) .......................... 201810956507.2

(51) Int. Cl.
   *G02F 1/1335* (2006.01)
   *G02F 1/133* (2006.01)
   (Continued)

(52) U.S. Cl.
   CPC .... *G02F 1/133512* (2013.01); *G02F 1/13306* (2013.01); *G02F 1/133514* (2013.01); *G02F 1/1343* (2013.01); *G09G 3/3648* (2013.01)

(58) Field of Classification Search
   CPC ........... G02F 1/13306; G02F 1/133512; G02F 1/133514; G02F 1/1343
   See application file for complete search history.

(56) References Cited

U.S. PATENT DOCUMENTS

2008/0198308 A1*  8/2008  Lee ................... G02F 1/133512
                                                      349/106
2016/0187679 A1   6/2016  Lin et al.
(Continued)

FOREIGN PATENT DOCUMENTS

CN       102636897 A     8/2012
CN       103955067 A     7/2014
(Continued)

OTHER PUBLICATIONS

First Office Action for CN Patent Application No. 201810956507.2 dated Dec. 24, 2020.
(Continued)

*Primary Examiner* — Dung T Nguyen
(74) *Attorney, Agent, or Firm* — Perilla Knox & Hildebrandt LLP; Kenneth A. Knox

(57) ABSTRACT

A 3D liquid crystal display panel includes: a first substrate, a second substrate, and a first grating layer including grating openings arranged in an array for realizing 3D display; and a CF layer including a plurality of filter units arranged in an array, a black matrix disposed between adjacent filter units, and at least one light shielding strip disposed inside each of the filter units and dividing each of the filter units into a plurality of light transmitting regions. The 3D liquid crystal display panel is configured to apply voltages to the electrode layer to form a liquid crystal grating in the liquid crystal layer, and a collimated light incident to the liquid crystal layer passes through the liquid crystal grating and pass through the filter unit to form a monochromatic light, and then, is emitted out from the grating openings.

14 Claims, 6 Drawing Sheets

(51) Int. Cl.
*G02F 1/1343* (2006.01)
*G09G 3/36* (2006.01)

(56) References Cited

U.S. PATENT DOCUMENTS

2016/0366401 A1  12/2016  Wu et al.
2020/0326584 A1* 10/2020  Tan .................... G02F 1/13439

FOREIGN PATENT DOCUMENTS

| | | | | |
|---|---|---|---|---|
| CN | 104865744 | A | | 8/2015 |
| CN | 104977724 | A | | 10/2015 |
| CN | 105093546 | A | | 11/2015 |
| CN | 105093653 | A | | 11/2015 |
| CN | 105372822 | A | | 3/2016 |
| CN | 105892081 | A | | 8/2016 |
| CN | 106526942 | A | | 3/2017 |
| CN | 106773086 | A | | 5/2017 |
| CN | 106773218 | A | | 5/2017 |
| CN | 106959523 | A | | 7/2017 |
| CN | 107209393 | A | | 9/2017 |
| CN | 107209406 | A | | 9/2017 |
| CN | 107209415 | A | | 9/2017 |
| CN | 107357092 | A | | 11/2017 |
| CN | 107430240 | A | | 12/2017 |
| CN | 107544156 | A | | 1/2018 |
| CN | 107797297 | A | | 3/2018 |
| CN | 112198705 | A | * | 1/2021 |
| JP | 2007226087 | A | | 9/2007 |
| JP | 2010-210982 | | * | 3/2009 ........... G02F 1/1335 |

OTHER PUBLICATIONS

Jinhong Gao et al, "New Display technology Volume 2," Beijing University of Posts and Telecommunications Press (Aug. 31, 2018).

\* cited by examiner

3D LIQUID CRYSTAL DISPLAY PANEL, DISPLAY DEVICE AND DRIVING METHOD

CROSS REFERENCE TO RELATED APPLICATIONS

The present application is based upon, and claims the benefit of and priority to, Chinese Patent Application No. 201810956507.2, filed on Aug. 21, 2018, the entire disclosure of which is hereby incorporated by reference as a part of the present application.

TECHNICAL FIELD

The present disclosure relates to the field of display technology and, more particularly, to a 3D liquid crystal display panel, a display device, and a driving method.

BACKGROUND

With the development and updating of display technology, in order to obtain a better display effect, the developed parallax-type 3 Dimensions (3D) display has become a development trend of display devices.

The 3D display has been developed from a glasses based parallax-type 3D display to a naked-eye parallax type 3D display. The naked eye 3D display technology does not require a viewer to wear an assistance tool, which is more suitable for people's viewing needs.

The above information disclosed in this Background section is only used to enhance an understanding of the background of the present disclosure, and thus it may include information that does not constitute prior art known to those of ordinary skill in the art.

SUMMARY

Embodiments of the present disclosure provide a 3D liquid crystal display panel, a display device, and a driving method.

An embodiment of the present disclosure provides a 3D liquid crystal display panel, including: a first substrate and a second substrate disposed opposite to each other to form a cell, and a first grating layer disposed at a light emitting side of the second substrate for realizing 3D display;

wherein the first grating layer includes grating openings arranged in an array;

an electrode layer, a liquid crystal layer, and a color filter CF layer are sequentially disposed on a side of the first substrate adjacent to the second substrate;

the CF layer includes a plurality of filter units arranged in an array, a black matrix disposed between adjacent filter units, and at least one light shielding strip disposed inside each of the filter units and dividing each of the filter units into a plurality of light transmitting regions; each filter unit corresponds to a sub-pixel of a monochromatic light;

the electrode layer includes a first electrode layer and a second electrode layer, and the 3D liquid crystal display panel is configured to apply voltages to the first electrode layer and the second electrode layer, respectively, to form a liquid crystal grating in the liquid crystal layer, so that a collimated light incident to the liquid crystal layer passes through the liquid crystal grating and changes the direction to pass through the plurality of light transmitting regions in the filter unit at different angles to form a monochromatic light, and then, is emitted out from the grating openings of the first grating layer.

Optionally, in the 3D liquid crystal display panel, the liquid crystal layer is configured to emit the collimated light incident to the liquid crystal layer in the original propagation direction in a non-operating state, so that the emitted light is irradiated onto the light shielding strip inside the filter unit.

Optionally, in the 3D liquid crystal display panel, the center of each of the filter units, and the center of the grating opening through which the monochromatic light emitted from the present filter unit passes, are in one straight line.

Optionally, in the 3D liquid crystal display panel, the first electrode layer includes sub-pixel electrodes corresponding to the filter units one by one, and each of the sub-pixel electrodes includes a plurality of first electrodes disposed at intervals. Applying voltages to the first electrode layer and the second electrode layer, respectively, to form a liquid crystal grating in the liquid crystal layer includes:

applying the same operating voltage to the first electrodes in each of the sub-pixel electrodes of the first electrode layer, and applying a common voltage to the second electrode layer to form an arc electric field between each of the first electrodes and the second electrode layer that drive the liquid crystals in the liquid crystal layer to change the deflection direction, thereby forming a liquid crystal grating.

Optionally, the 3D liquid crystal display panel, further includes: a collimated light source disposed on a side of the first substrate away from the second substrate.

Optionally, the 3D liquid crystal display panel, further includes: a second grating layer disposed between the first substrate and the electrode layer, wherein the grating layer includes grating units corresponding to the filter units one by one, and at least one light extraction grating is disposed in each of the grating units, and the light extraction grating in each of the grating units is disposed in an orthographic projection area of the light shielding strip in the corresponding filter unit in the present grating unit in a plane in which the second grating layer is located;

the first substrate is configured to perform optical waveguide transmission on a side-entry type incident light in the first substrate; and the light extraction grating is configured to irradiate the light transmitted in the first substrate onto the liquid crystal layer in a collimated manner.

Optionally, in the 3D liquid crystal display panel, when only one light shielding strip is disposed in each filter unit, and one or more light extraction gratings are disposed in the grating unit corresponding to the filter unit in the second grating layer, the one or more light extraction gratings are located in the orthographic projection area of the light shielding strip of the filter unit in the plane where the second grating layer is located;

or, when a plurality of light shielding strips are disposed in each filter unit, and the grating unit corresponding to the filter unit in the second grating layer is provided with light extraction gratings corresponding to the light shielding strips one by one, each of the light extraction gratings is located in the orthographic projection area of the light shielding strip corresponding to the present light extraction grating in the plane where the second grating layer is located.

An embodiment of the present disclosure also provides a display device including the 3D liquid crystal display panel described above.

An embodiment of the present disclosure also provides a driving method of the 3D liquid crystal display panel described above, including:

applying voltages to the first electrode layer and the second electrode layer respectively, to form a liquid crystal grating in the liquid crystal layer, so that a collimated light incident to the liquid crystal layer passes through the liquid crystal grating and changes the direction to pass through the plurality of light transmitting regions in the filter unit at different angles to form a monochromatic light, and then, is emitted out from the grating openings of the first grating layer.

Optionally, in the driving method, the first electrode layer includes sub-pixel electrodes corresponding to the filter units one by one, and each of the sub-pixel electrodes includes a plurality of first electrodes disposed at intervals, and applying voltages to the first electrode layer and the second electrode layer respectively, to form a liquid crystal grating in the liquid crystal layer includes:

applying the same operating voltage to the first electrodes in each of the sub-pixel electrodes of the first electrode layer, and applying a common voltage to the second electrode layer to form an arc electric field between each of the first electrodes and the second electrode layer that drives the liquid crystals in the liquid crystal layer to change the deflection direction, thereby forming a liquid crystal grating.

It should be understood that both the foregoing general description and the following detailed description are exemplary and explanatory only and are not restrictive of the disclosure.

BRIEF DESCRIPTION OF THE DRAWINGS

The accompanying drawings are used to provide a further understanding of the technical solutions of the present disclosure, and constitute a part of the specification, which together with the embodiments of the present application, serve to explain the technical solutions of the present disclosure, and do not constitute a limitation of the technical solutions of the present disclosure.

DETAILED DESCRIPTION

In order to make the objectives, technical solutions, and advantages of the present disclosure more apparent, the embodiments of the present disclosure will be described in detail below with reference to the accompanying drawings. It should be noted that the embodiments and the features in the embodiments in the present application may be combined with each other in any way without conflict.

The steps illustrated in the flowchart of the figures may be executed in a computer system such as a set of computer executable instructions. Also, although logical sequences are shown in the flowcharts, in some cases the steps shown or described may be performed in a different order than that described herein.

The following specific embodiments of the present disclosure may be combined with each other, and the same or similar concepts or processes may not be repeated in some embodiments.

A liquid crystal display (LCD) is a display device that is currently used on a large scale. It has several advantages, such as high color gamut, a fast response time, and mature technology, and can satisfy two-dimension (2-Dimension, referred to as 2D) display demand. A 3D display developed based on the LCD display has become the mainstream product of the naked eye 3D display. However, when the video is viewed by the naked eye 3D display, display problems such as crosstalk, moiré, or dead zone may occur as the human eyes move. The reason is that the eye box of the naked eye 3D display technology is too small, which limits the range of movement of the human eyes.

In recent years, eye tracking technology has been highly expected to solve the display problems of the naked eye 3D display in the human eye moving process, but the response time of the visual tracking system is relatively slow, and the view switching cannot be realized effectively. Therefore, in the problem of the naked eye 3D display, it is necessary not only to improve the response time of the system, but also increase the eye box of the naked eye 3D display, leaving more time for the system to switch views.

Figure 1:
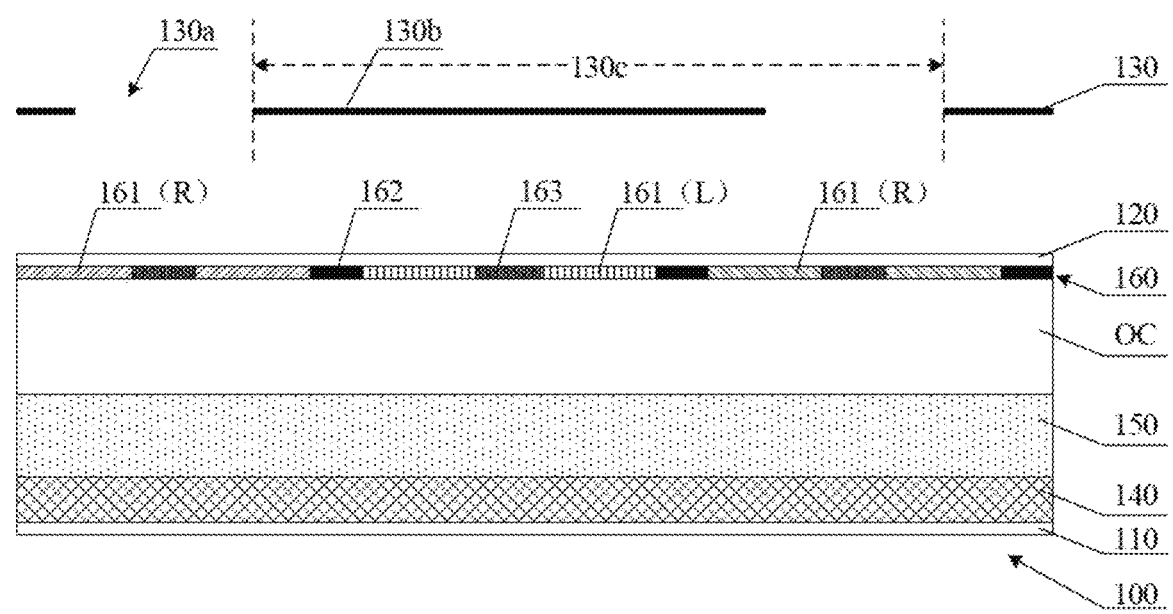
FIG. 1 is a schematic structural diagram of a 3D liquid crystal display panel according to an embodiment of the present disclosure.

FIG. 1 is a schematic structural diagram of a 3D liquid crystal display panel according to an embodiment of the present disclosure. The 3D liquid crystal display panel 100 according to the embodiment may include: a first substrate 110 and a second substrate 120 disposed opposite to each other to form a cell, and a first grating layer 130 that is disposed at a light emitting side of the second substrate 120 for realizing 3D display.

The first grating layer 130 includes grating openings 130a arranged in an array.

An electrode layer 140, a liquid crystal layer 150, and a color filter (CF) layer 160 are sequentially disposed on a side of the first substrate 110 adjacent to the second substrate 120.

The CF layer 160 includes a plurality of filter units 161 arranged in an array, a black matrix 162 disposed between adjacent filter units 161, and at least one light shielding strip 163 disposed inside each of the filter units 161 and dividing each of the filter units 161 into a plurality of light transmitting regions. In the embodiment of the present disclosure, each filter unit 161 corresponds to one sub-pixel. That is, light emitted from one filter unit 161 passes through a corresponding grating opening to form a view corresponding to one sub-pixel.

The electrode layer 140 includes a first electrode layer 141 and a second electrode layer 142. The first electrode layer 141 and the second electrode layer 142 may be separated by an isolation layer between them, and the isolation layer is made of, for example, as a silicon nitride (SiNx) material. The 3D liquid crystal display panel 100 according to the embodiment of the present disclosure is configured to apply voltages to the first electrode layer 141 and the second electrode layer 142 respectively, to form a liquid crystal grating in the liquid crystal layer 150, so that a collimated light incident to the liquid crystal layer 150 passes through the liquid crystal grating and changes the direction to pass through the plurality of light transmitting regions in the filter unit 161 at different angles to form a monochromatic light, and, thereafter, is emitted from the grating openings 130*a* of the first grating layer 130.

The 3D liquid crystal display panel 100 according to the embodiment of the present disclosure can be applied to a naked eye 3D display. The main structure of the 3D liquid crystal display panel 100 includes two parts, namely, a 3D device and a 2D device. The 3D device is the first grating layer 130, which is a barrier grating. The barrier grating can realize the display effect of the naked eye 3D. The remaining structures are the 2D device. The first grating layer 130 can be adhered to a light emitting side of the 2D device with an adhesive material, specifically adhered to a light emitting side of the second substrate 120. The embodiment of the present disclosure will be illustrated taking a 3D display of two views as an example. It is assumed that a light emitted out of a filter unit 161, referred to as 161 (L) in FIG. 1, forms an eye box as a left-eye view, and a light emitted out of an adjacent filter unit 161, referred to as 161 (R) in FIG. 1, forms an eye box as a right-eye view, thereby realizing the display effect of naked eye 3D through parallax. Based on a conventional display panel structure, in the 3D liquid crystal display panel 100 of the embodiment of the present disclosure, an insulating layer is disposed between the liquid crystal layer 150 and the CF layer 160. The insulating layer is, for example, an organic polymer (OC) layer made of a resin type or an acrylate type material, and may protect the liquid crystal layer 150.

In practical application, the grating period 130*c* of the first grating layer 130 (i.e., the sum of the widths of one grating opening 130*a* and one grating strip 130*b*, as shown in FIG. 1) satisfies the design specification of the barrier grating in the conventional naked eye 3D. For example, if the 3D liquid crystal display panel 100 is a two-view 3D display panel forming a left eye view and a right eye view as shown in FIG. 1, the grating period 130*c* in the first grating layer 130 is about twice of the period of the filter unit 161. The grating period 130*c* of the first grating layer 130 shown in FIG. 1 is shown as an example of the application scenarios. In another example, if the 3D liquid crystal display panel 100 is a four-view 3D display panel, the grating period in the first grating layer 130 is about four times of the period of the filter unit 161. That is, if the 3D liquid crystal display panel 100 is an n-view 3D display panel, the grating period of the first grating layer 130 is about n times the period of the filter unit 161, where n is a positive integer greater than or equal to 2. In the 3D liquid crystal display panel 100 according to the embodiment of the present disclosure, the value of n may be less than 10. In addition, the grating period may be calculated according to a calculation method of a similar triangle, and the period of the filter unit 161 and the number of views forming the naked eye 3D in the liquid crystal display panel 100, and a distance from the first grating layer 130 to the filter unit 161 are all related to the grating period.

It should be noted that only the proportional relationship between the grating period 130*c* of the first grating layer 130 and the period of the filter unit 161 is illustrated in FIG. 1. The position of the grating opening 130*a* is only a schematic illustration in FIG. 1, and the specific arrangement of the first grating layer 130 in the embodiment of the present disclosure is not limited by the position of the grating opening 130*a* shown in FIG. 1.

In the embodiment of the present disclosure, the function of the electrode layer 140 is to modulate the liquid crystals in the liquid crystal layer 150. For example, by applying a voltage to the electrode layer 140 to change the deflection direction of the liquid crystals in the liquid crystal layer 150, a collimated light incident to the liquid crystal layer 150 may change its transmission direction, that is, the incident collimated light is scattered into light of a plurality f angles and is emitted from the liquid crystal layer 150 to the CF layer 160, and is emitted at all angles to realize a display function. In practical application, the first electrode layer 141 is, for example, a pixel electrode layer, the second electrode layer 142 is, for example, a common electrode layer, and different voltages can be applied to different electrode layers. For example, a high voltage is applied to the first electrode layer 141, and a low voltage is applied to the second electrode layer 142, for example, 0 volts (V). A voltage difference generated between the first electrode layer 141 and the second electrode layer 142 drives the liquid crystal molecules in the liquid crystal layer 150 to change the deflection direction, forming a liquid crystal grating similar to a light extraction grating, which can change the direction of the collimated light incident to the liquid crystal layer 150 through the liquid crystal grating to form a monochromatic light passing through the plurality of light transmitting regions in the filter unit 161 at different angles and then emitted from the grating opening 130*a* of the first grating layer 130. In the process of light propagation, since the light emitted from the liquid crystal layer 150 has the direction changed instead of being collimated light, little light emitted is irradiated to the light shielding strip 163 inside the filter unit 161. In addition, since the modulation of the layer 150 by the electrode layer 140 is controllable, and the direction of the emitted light and the illumination range can be controlled by the magnitude of the voltage difference, the emitted light is irradiated to the light transmitting region of the filter unit 161 as much as possible.

Figure 2:
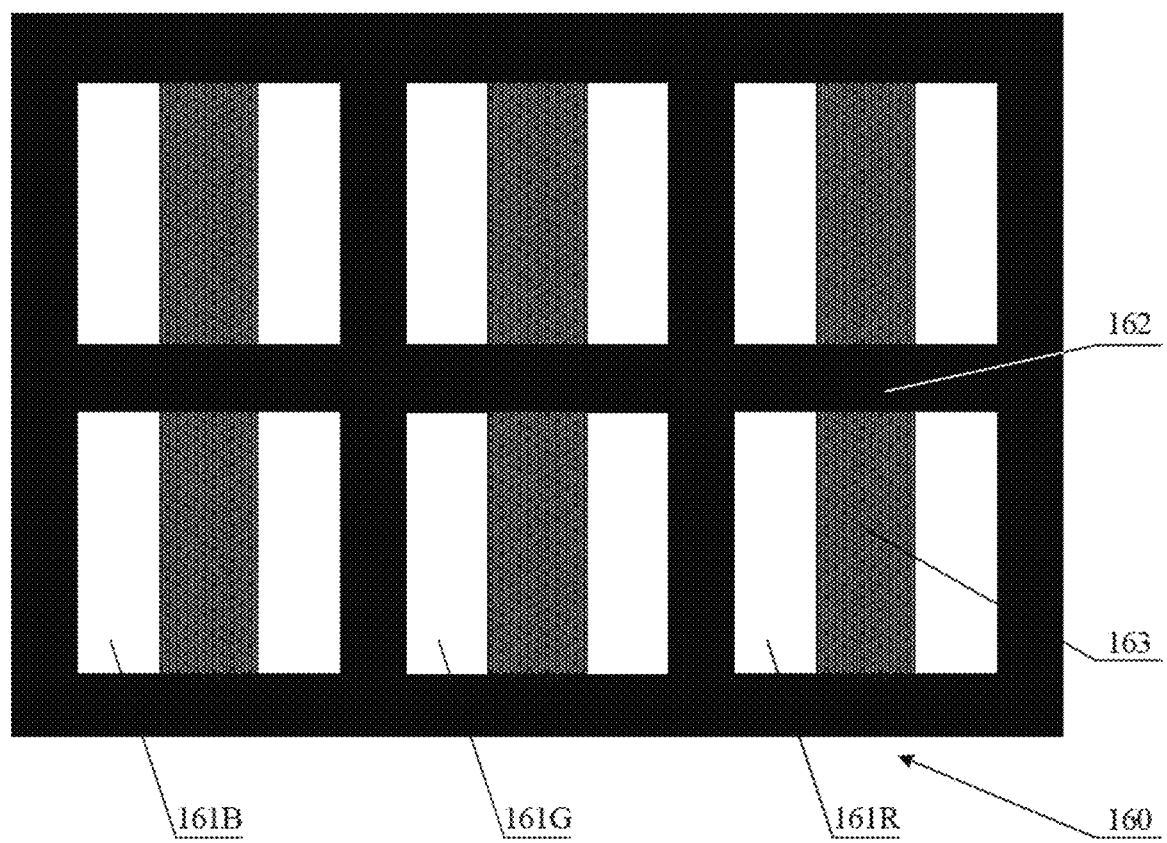
FIG. 2 is a top view of a color filter layer in a 3D liquid crystal display panel according to an embodiment of the present disclosure.

FIG. 2 is a top view of a color filter layer in a 3D liquid crystal display panel according to an embodiment of the present disclosure. As shown in FIG. 2, the embodiment of the present disclosure is illustrated taking the CF layer 160 including filter units 161 of three colors: red, green, and blue (RGB) as an example, respectively referred to as, a red filter unit 161R, a green filter unit 161G, and a blue filter unit 161B. It can be seen that a black matrix 162 is disposed between adjacent filter units 161, and the black matrix 162 is configured to block the light transmitted by the adjacent filter units 161 to avoid light leakage. Each of the filter units 161 is further disposed inside at least one light shielding strip 163, which is an important structure feature for expanding the range of the eye box in implementing naked eye 3D display in the 3D liquid crystal display panel 100 according to the embodiment of the present disclosure. The implementation of how the light shielding strip 163 functions to expand the range of the eye box will be described in detail below.

It is to be noted that the embodiment shown in FIG. 2 is illustrated taking one light shielding strip 163 disposed in each of the filter units 161 as an example. The number and layout of the light shielding strip 163 disposed inside each of the filter units 161 is not limited in the embodiment of the present disclosure, but the number of the light shielding strip 163 disposed inside each of the filter units 161 can be determined depending on the area of the filter unit 161 and the brightness requirement of the 3D liquid crystal display panel 100. In addition, when a plurality of light shielding strips 163 are disposed in the filter unit 161, the light shielding strips 163 may be parallel or perpendicular to each other to form a different array layout.

Figure 3:
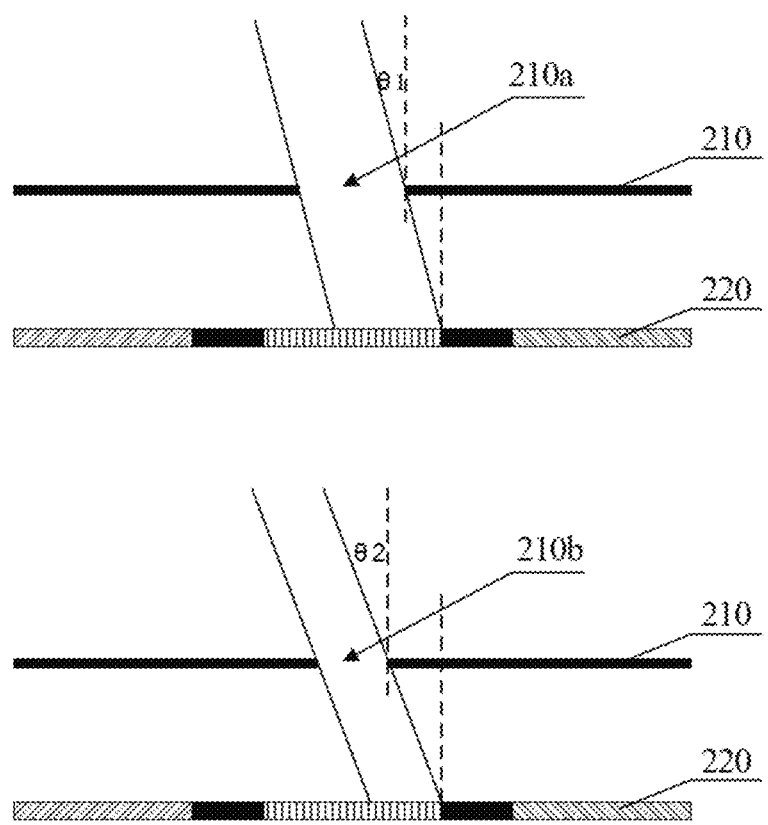
FIG. 3 is a schematic diagram showing a relationship between an aperture ratio of the grating and a visible range in a naked eye 3D display.

In the related art, in order to obtain a larger range of the eye box for a naked eye 3D display, the aperture ratio of the grating is generally designed to be small. As shown in FIG. 3, a schematic diagram showing a relationship between an aperture ratio of the grating and a visible range in a naked eye 3D display is illustrated. The sub-pixel formed by one filter unit in FIG. 3 is taken as an example. When the distance between the light-shielding grating 210 and the color film layer 220 of the display panel is constant, the smaller the grating opening, the larger the angle θ, and the larger the range of the eye box. That is, the grating opening 210a is larger than the grating opening 220b, $\theta_1$ is smaller than $\theta_2$, and the range of the eye box 1 is smaller than the range of the eye box 2. In the existing naked eye 3D display, the aperture ratio of the grating is usually designed to be about 20%, which may reduce the transmittance and display luminance of the naked eye 3D display, and affect the viewing effect of the display.

Figure 4:
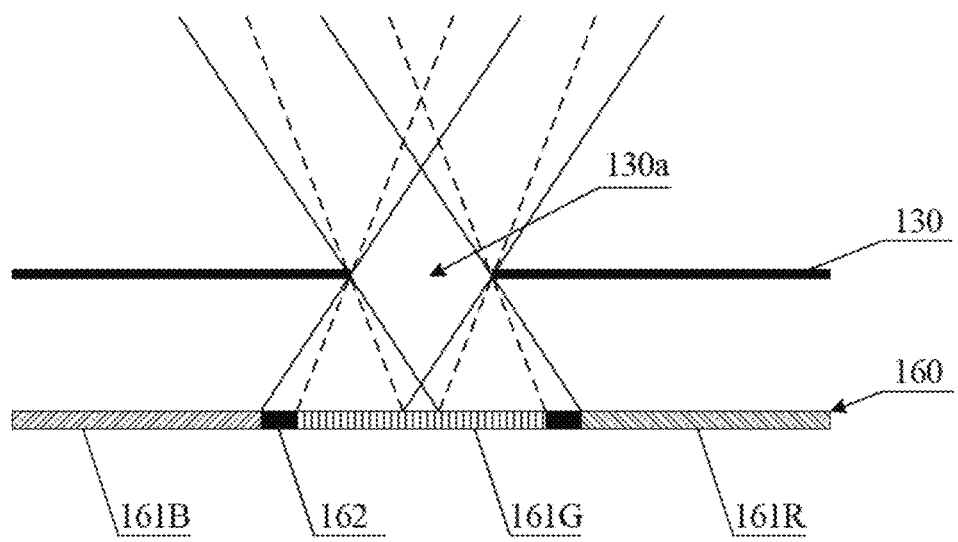
FIG. 4 is a schematic diagram of a visible range of a naked eye 3D display implemented by an existing display panel.
Figure 5:
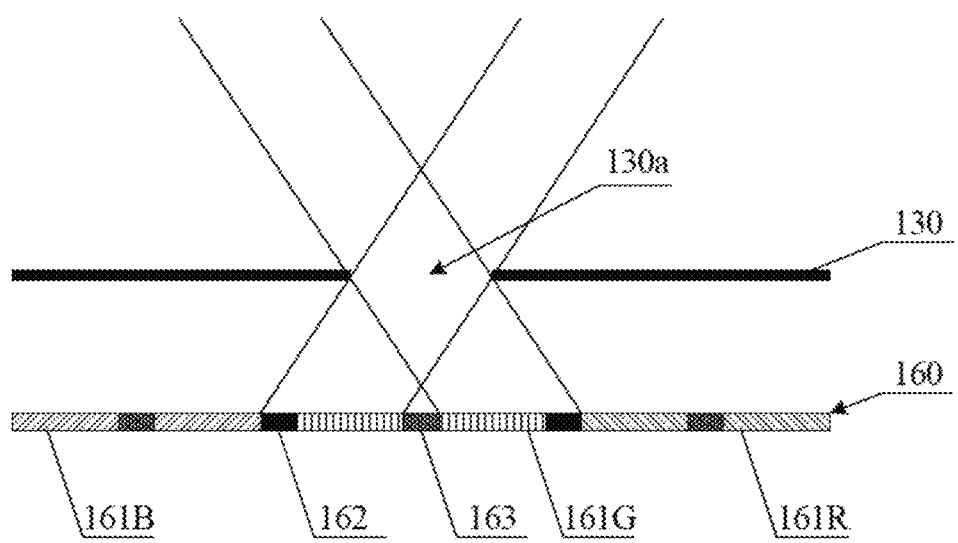
FIG. 5 is a schematic diagram of a visible range of a naked eye 3D display implemented by a 3D liquid crystal display panel according to an embodiment of the present disclosure.

The 3D liquid crystal display panel 100 according to the embodiment of the present disclosure can obtain a larger range of the eye box under the same aperture ratio of the grating. The eye box of the naked eye 3D display in the related art will be compared with the range of the eye box of the naked eye 3D display implemented by the 3D liquid crystal display panel 100 of the embodiment of the present disclosure. FIG. 4 is a schematic diagram of a visible range of a naked eye 3D display implemented by an existing display panel, and FIG. 5 is a schematic diagram of a visible range of a naked eye 3D display implemented by a 3D liquid crystal display panel according to an embodiment of the present disclosure. First, it is noted that the reference for determining the range of the eye box is that: relative to a certain sub-pixel, the light of other sub-pixels is not visible and there is no brightness change in the range of the eye box. The dotted-line area in FIG. 4 shows the range of the eye box of the naked eye 3D display implemented by an existing display panel, and the solid-line area in FIG. 5 shows the range of the eye box of the naked eye 3D display implemented by the 3D liquid crystal display panel 100 according to the embodiment of the present disclosure. For convenience of comparison, the solid-line area in FIG. 4 shows the range of the eye box of the naked eye 3D display implemented by the 3D liquid crystal display panel 100 according to the embodiment of the present disclosure. It can be seen that both FIG. 4 and FIG. 5 are illustrated by taking a sub-pixel formed by light passing through the green filter unit 161G as an example. The range of the eye box of the sub-pixel in FIG. 4 is a range in which the light is emitted from the filter unit 161G, that is, the range of the dotted-line area, the brightness of the sub-pixels displayed in the dotted-line area is uniform. Since at least one light shielding strip 163 is disposed inside each of the filter units 161 in the CF layer 160 in the embodiment of the present disclosure, based on the reference for determining the range of the eye box, and since in FIG. 5, one light shielding strip 163 is disposed in the center of each filter units 161, for example, it can be seen that when the human eye and the grating opening 130a in FIG. 5 have a viewing angle of 0 degrees, that is, the human eye views the grating opening 130a vertically, the light shielding strip 163 disposed at the center of the green filter unit 161G can be seen, and no light is emitted from the area around the light shielding strip 163, which means that the disposition of the light shielding strip 163 may affect the brightness of the sub-pixel. Therefore, when the human eye views the grating opening 130a obliquely, for example, when the viewing angles of the human eye and the grating opening 130a are [−88°, 0°) and (0°, 88°), if the range of the eye box is the same as the range of the dotted-line are in FIG. 4, the display luminance at a viewing angle of 0 degree from the human eye will be lower than the display luminance at other viewing angels. Therefore, according to the above reference for determining the range of the eye box, in the embodiment of the present disclosure, in order to ensure the brightness of the sub-pixel at various viewing angles is substantially the same, the range of the eye box of the sub-pixel may include black matrices 162 respectively at the two sides of the corresponding filter unit 161. Thus, the area of the light shielding strip 163, or the black matrix 162, or the light shielding strip 163 and the black matrix 162 seen by the human eye at any viewing angle in the range of [−88°, 88°] is substantially the same, and the brightness is substantially the same. That is, although no light is emitted from the black matrix 162 and the light shielding strip 163, the visible range at the same brightness can be expanded, so that the visible range of the naked eye 3D display implemented by the 3D liquid crystal display panel 100 according to the embodiment of the present disclosure can be larger than that of the existing display panel. That is, when the aperture ratio of the grating is the same, a larger range of the eye box can be achieved in the naked eye 3D display implemented by the 3D liquid crystal display panel 100 according to an embodiment of the present disclosure. Therefore, the 3D liquid crystal display panel 100 according to an embodiment of the present disclosure does not need to expand the range of the eye box of the naked eye 3D display at the expense of reducing the display luminance, and can provide a larger moving range for the human eyes, and allow for longer response time for visual tracking techniques for switching views.

The 3D liquid crystal display panel 100 according to the embodiment of the present disclosure includes a first substrate 110 and a second substrate 120 disposed opposite to each other to form a cell, and a first grating layer 130 is disposed at a light emitting side of the second substrate 120 for realizing 3D display. The first grating layer 130 includes grating openings 130a arranged in an array. An electrode layer 140, a liquid crystal layer 150, and a CF layer 160 are sequentially disposed on a side of the first substrate 110 adjacent to the second substrate 120. The electrode layer 140 includes a first electrode layer 141 and a second electrode layer 142. The 3D liquid crystal display panel 100 can apply voltages to the first electrode layer 141 and the second electrode layer 142 respectively, to form a liquid crystal grating in the liquid crystal layer 150 so that a collimated light incident to the liquid crystal layer 150 passes through the liquid crystal grating and changes the direction to pass through the plurality of light transmitting regions in the filter unit 161 at different angles to form a monochromatic light, and then, is emitted out from the grating openings 130a of the first grating layer 130. On one hand, based on the structure feature of the light shielding strip 163 disposed inside the filter units 161 of the CF layer 160, the black matrix 162 and the light shielding strip 163 in the CF layer 160 may increase the area of the visible range at the same brightness, that is, can expand the range of the eye box of the sub-pixel in the 3D liquid crystal display panel 100 so that the 3D liquid crystal display panel 100 according to the present disclosure does not need to expand the range of the eye box at the expense of reducing the display luminance. That is, it can expand the visible range of the naked eye 3D display device, and, at the same time, can maintain a high display luminance and reserve longer response time for visual tracking technology for switching views.

On the other hand, the modulation mode of the liquid crystal layer in the existing display panel is generally to change the polarization direction of the light. The display panel of the existing structure is further provided with a polarizing plate. After the light incident to the display panel is adjusted by the liquid crystal layer, only the polarized light having the same axial direction as the polarizing plate at the light emitting side can pass through the polarizing plate at the light emitting side. This may greatly reduce the strength of the emitted light, and reduce the display luminance of the display panel. In the 3D liquid crystal display panel 100 according to the embodiment of the present disclosure, due to the modulation of the electrode layer 140 to the liquid crystal layer 150, rather than changing the polarization direction of the light, but only the transmission direction of the light is changed, which can ensure that the emitted light can irradiate to the light transmission regions (i.e., the regions having no black matrix 162 and the light shielding strip 163) of the filter unit 161 as much as possible, and can further improve the light transmittance and the display luminance of the 3D liquid crystal display panel 100.

Figure 6:
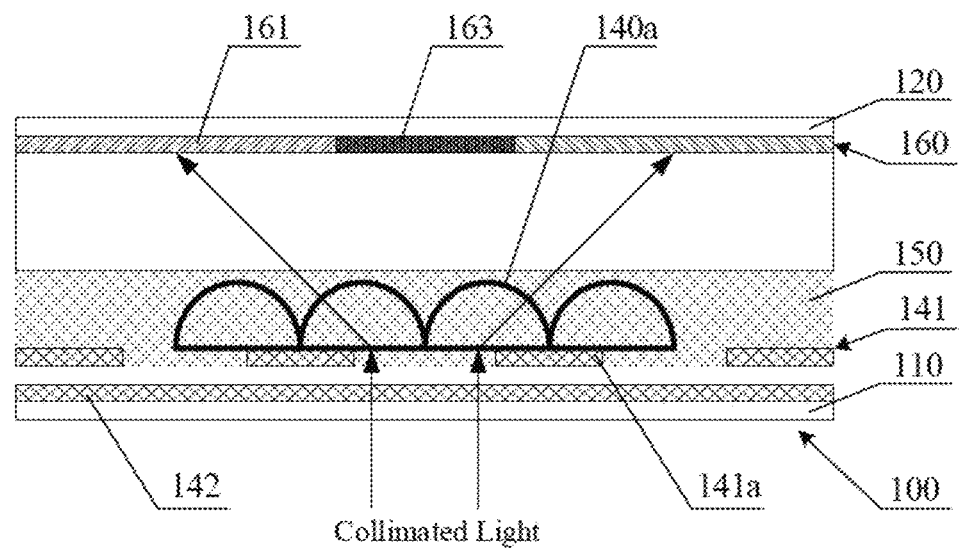
FIG. 6 is a schematic structural diagram of another 3D liquid crystal display panel according to an embodiment of the present disclosure.

Optionally, FIG. 6 is a schematic structural diagram of another 3D liquid crystal display panel according to an embodiment of the present disclosure. Based on the structure of the 3D liquid crystal display panel 100 shown in FIG. 1, FIG. 6 only illustrates the 2D device in the 3D liquid crystal display panel 100, and only the structure corresponding to one filter unit 161 is illustrated.

In the 3D liquid crystal display panel 100 of the embodiment of the present disclosure, the first electrode layer 141 includes sub-pixel electrodes corresponding to the filter units 161 one by one, and each of the sub-pixel electrodes includes a plurality of first electrodes 141a disposed at intervals. In the above embodiment, applying voltages to the first electrode layer 141 and the second electrode layer 142 respectively, to form a liquid crystal grating in the liquid crystal layer 150 may be implemented by the following manners.

The same operating voltage is applied to the first electrodes 141a in each of the sub-pixel electrodes of the first electrode layer 141, and a common voltage is applied to the second electrode layer 142 (the common voltage may be selected as a voltage of 0 V). An arc electric field is formed between each of the first electrodes 141a and the second electrode layer 142 to drive the liquid crystals in the liquid crystal layer 150 to change the deflection direction, thereby forming a liquid crystal grating.

An arc electric field 140a formed between a plurality of first electrodes 141a and the second electrode layer 142 in one sub-pixel electrode is illustrated in FIG. 6. As can be seen from FIG. 6, the period of the first electrode 141a (this period includes a sum of a width of the first electrode 141a and a spacing between two adjacent first electrodes 141a) may be twice of the period of the arc electric field. Moreover, since the arc electric field 140a is formed by the driving of the electrode layer 140, and the liquid crystal layer 150 is under the driving action of the arc electric field 140a, the deflection direction of the liquid crystals in the vicinity of the arc electric field 140a is changed to form a liquid crystal grating which can emit incident collimated rays at different angles. It should be noted that although all the first electrodes 141a of one sub-pixel electrode in the first electrode layer 141 are applied with the same operating voltage, in order to realize different gray scale display of the 3D liquid crystal display panel 100, the operating voltages applied to the first electrodes 141a of different sub-pixel electrodes in the first electrode layer 141 are normally different.

Optionally, the correspondence between the grating period 130c (including the sum of the width of the grating opening 130a and the width of the grating strip 130b) in the first grating layer 130 and the filter unit 161 in the CF layer 160 has been described in the above embodiment. In the 3D liquid crystal display panel 100, the center of each of the filter units 161, and the center of the grating opening 130a through which the monochromatic light emitted from the present filter unit 161 passes are in one straight line. In addition, for a user viewing the 3D liquid crystal display panel 100, the centers of the human eyes is also on the straight line of the above two points. In this manner, it is possible to effectively realize the display effect of the naked eye 3D.

Figure 7:
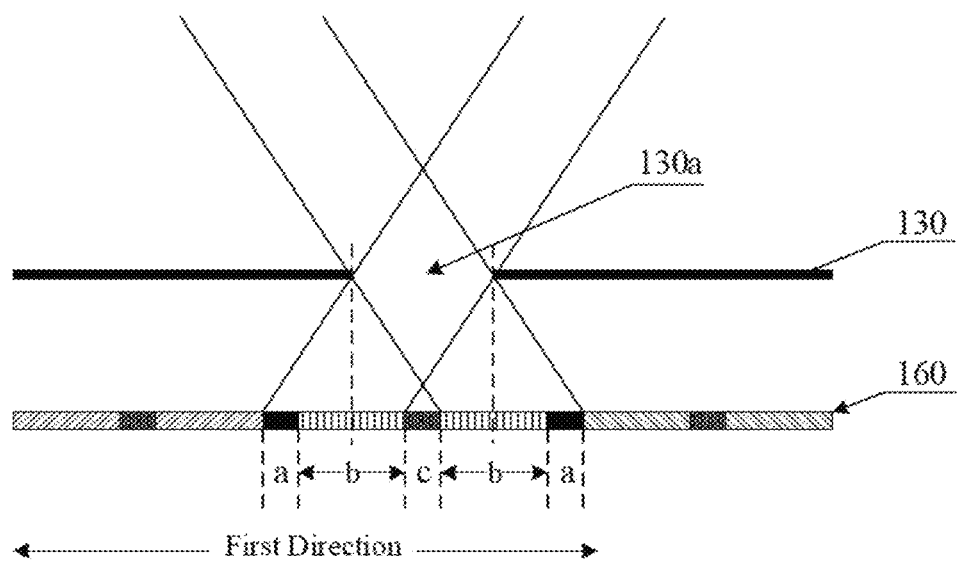
FIG. 7 is a schematic diagram showing an aperture ratio of the grating of a 3D display implemented by a liquid crystal display panel according to an embodiment of the present disclosure.

In the structural design of the 3D liquid crystal display panel 100 according to the embodiment of the present disclosure, it may be considered whether the aperture ratio of the grating opening 130a in the first grating layer 130 has to match with the parameters of the 2D device. As shown in FIG. 7, a schematic diagram showing an aperture ratio of the grating of a 3D display implemented by a liquid crystal display panel according to an embodiment of the present disclosure is shown. FIG. 7 shows that, as an example, the 3D liquid crystal display panel 100 is a two-view display panel, the filter unit 161 includes a light shielding strip 163, and the light shielding strip 163 is disposed at the central position of the filter unit 161 in a first direction. FIG. 7 illustrates a side view effect of the 3D liquid crystal display panel 100 in the first direction. The width of the sub-pixel in the first direction defined by the filter unit 161 in the CF layer 160 is: a+2b+c. The width of the sub-pixel that can be seen by the human eye through the grating opening 130a is: b+c, that is, the aperture ratio of the grating in the first grating layer 130 is:

$$\frac{b+c}{2*(a+2b+c)} \quad (1)$$

In the above formula (1), a denotes the width of the black matrix 162 in the first direction, b denotes half of the width of the light transmitting region of the filter unit 161 in the first direction, c denotes the width of the light shielding strip 163 in the first direction, a+2b+c denotes a width of the sub-pixel defined by the filter unit 161 in the first direction, and b+c denotes the width of the sub-pixel that can be seen by the human eye in the first direction through the grating opening 130a. Since the 3D liquid crystal display panel 100 is a two-view display panel, the width of the visible area for calculating the aperture ratio of the grating in the first direction is: 2*(a+2b+c).

In practical application, the magnitude relationship between the width a of the black matrix 162 and the width c of the light shielding strip 163 may be: c>a, or, c=a, or c<a. It can be seen from the schematic diagram of the aperture ratio of the grating in the naked eye 3D display shown in FIG. 7 that the calculation formula of the aperture ratio of the grating of the 3D liquid crystal display panel 100 is regardless of the magnitude relationship of a and c. Therefore, regardless of the design parameters of the 2D device in the 3D liquid crystal display panel 100 according to the embodiment of the present disclosure, the calculation formula of the aperture ratio of the grating of the 3D liquid crystal display panel 100 is the same. Thus, various design parameters of the 2D device may satisfy design requirements of different aperture ratio of the gratings in the embodiment of the present disclosure, so as to obtain the range of the eye box of the naked eye 3D display under different conditions.

Optionally, in the embodiment of the present disclosure, the 3D device of the 3D liquid crystal display panel 100 (i.e., the first grating layer 130) and the 2D device (other structures than the first grating layer 130) are attached by adhering the first grating layer 130 to the second substrate 120 through an adhesive layer. That is, the distance between the first grating layer 130 and the CF layer 160 is the thickness of the sum of the thickness of the adhesive layer for adhering the first grating layer 130 and the thicknesses of the second substrates 120. In the design of the 3D liquid crystal display panel 100 according to the embodiment of the present disclosure, the viewing distance of the human eye to the 3D liquid crystal display panel 100 can be controlled by adjusting the sum of the thickness of the adhesive layer and the thickness of the second substrate 120.

It has been described in the above embodiment that the light incident to the liquid crystal layer 150 is a collimated light. Therefore, the collimated light source can be provided to the 3D liquid crystal display panel 100 according to the embodiment of the present disclosure.

In an implementation of the embodiment of the present disclosure, the incident collimated light may be provided by a collimated light source layer disposed on a side of the first substrate 110 away from the second substrate 120. In this implementation, the backlight of the 3D liquid crystal display panel 100 is the collimated light source layer for providing the collimated light.

Figure 8:
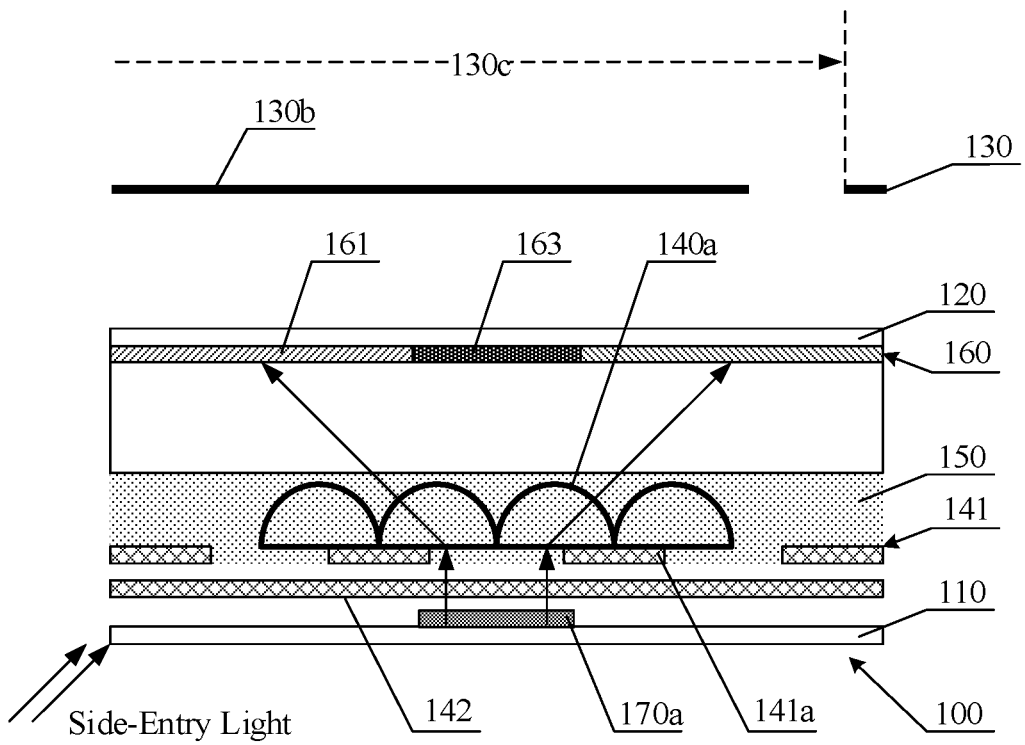
FIG. 8 is a schematic structural diagram of still another 3D liquid crystal display panel according to an embodiment of the present disclosure.

In another implementation of the embodiment of the present disclosure, as shown in FIG. 8, which is a schematic structural diagram of still another 3D liquid crystal display panel according to an embodiment of the present disclosure, and FIG. 8 is based on the 3D liquid crystal display panel 100 shown in FIG. 6, for example. The difference between FIG. 8 and FIG. 6 is that the light source of the 3D liquid crystal display panel 100 shown in FIG. 8 is not a collimated light source, but a side-entry type light source. The side-entry type light source can emit a side-entry type incident light. The 3D liquid crystal display panel 100 according to the embodiment shown in FIG. 8 may further include: a second grating layer 170 disposed between the first substrate 110 and the electrode layer 140. The second grating layer 170 includes grating units corresponding to the filter units 161 one by one, each of the grating units is provided with at least one light extraction grating 170*a*, and the light extraction grating 170*a* of each of the grating units is disposed in an orthographic projection area of the light shielding strip 163 in the corresponding filter unit 161 in the present grating unit in a plane in which the second grating layer 170 is located. Since only one filter unit 161 is illustrated in FIG. 8, only the structure of the light extraction grating 170*a* in the grating unit corresponding to the filter unit 161 in the second grating layer 170 is illustrated, and the overall structure of the second grating 170 is not illustrated. In addition, a space for the light extraction grating 170*a* is not provided between the first substrate 110 and the electrode layer 140 (specifically, the second electrode layer 142), and an insulating layer, for example, of a resin (Resin) type material, may be disposed there.

The first substrate 110 is configured to perform optical waveguide transmission on the side-entry type incident light in the first substrate 110.

The light extraction grating 170*a* is configured to irradiate the light transmitted in the first substrate 110 onto the liquid crystal layer 150 in a collimated manner.

In the embodiment of the present disclosure, the 2D device may employ a side-entry type light source to emit a side-entry type light. The first substrate 110 may be an optical waveguide layer, functioning as a waveguide grating, and the light incident on the first substrate 110 is total reflected in the first substrate 110. Since the aperture region of each of the grating units is provided with the light extraction grating 170*a*, the light totally reflected in the first substrate 110 can be taken out and irradiated in a collimated manner into the liquid crystal layer 150. When the liquid crystal layer 150 is in operation, that is, the electrode layer 140 is modulating the liquid crystal layer 150 to change the propagation direction of the collimated light incident into the liquid crystal layer 150, the emitted light passes through the plurality of light transmission regions in the filter unit 161 at all angles to form a monochromatic light and then is emitted from the corresponding grating opening 130*a* to realize the bright state display of the naked eye 3D. FIGS. 1, 6, and 8 are schematic diagrams of the bright state display in the naked eye 3D display.

It should be noted that, in FIG. 8, only one light shielding strip 163 is disposed in the filter unit 161, and only one light extraction grating 170 *a* is included in the grating unit corresponding to the filter unit 161 as an example. In practical application, the manner in which the light extraction grating 170*a* is disposed in each of the grating units of the second grating layer 170 may include the following implementations.

In a first implementation, when one light shielding strip 163 is disposed in one certain filter unit 161, one light extraction grating 170*a* is disposed in the grating unit corresponding to the filter unit 161 in the second grating layer 170. The light extraction grating 170*a* is located in the orthographic projection area of the light shielding strip 163 of the filter unit 161 in the plane where the second grating layer 170 is located. For this case, reference may be made to the structure shown in FIG. 8.

In a second implementation, when one light shielding strip 163 is disposed in one certain filter unit 161, a plurality of light extraction gratings 170*a* are disposed in the grating unit corresponding to the filter unit 161 in the second grating layer 170, and the light extraction gratings 170*a* are located in the orthographic projection area of the light shielding strip 163 of the filter unit 161 in the plane where the second grating layer 170 is located.

In a third implementation, when a plurality of light shielding strips 163 are disposed in a certain filter unit 161, the grating unit corresponding to the filter unit 161 in the second grating layer 170 is provided with light extraction gratings 170*a* corresponding to the light shielding strips 163 one by one, and each light extraction grating 170*a* is located in the orthographic projection area of the light shielding strip 163 corresponding to the present light extraction grating 170*a* in the plane where the second grating layer 170 is located.

Figure 9:
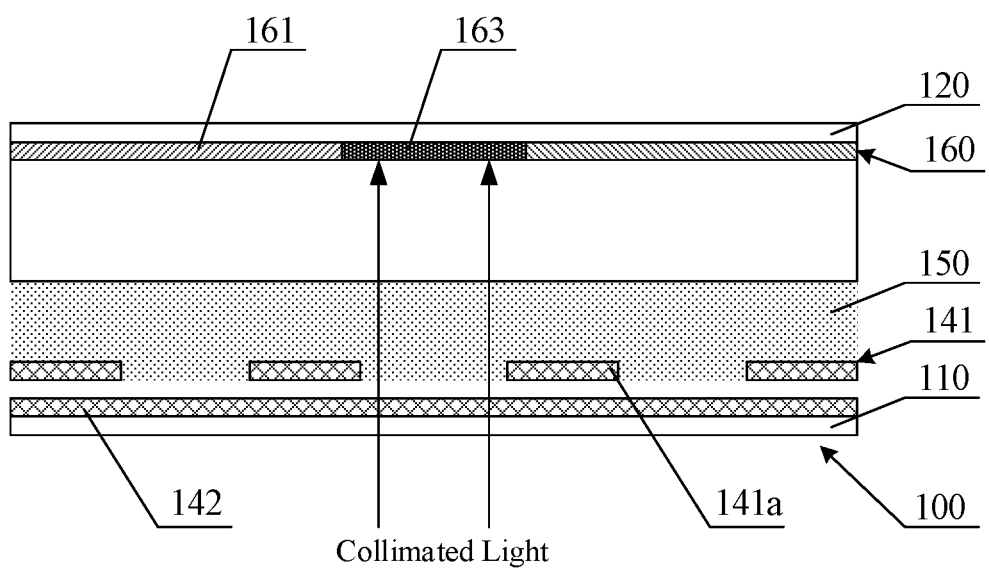
FIG. 9 is a schematic diagram of a dark state display in a naked eye 3D display implemented by a 3D liquid crystal display panel according to an embodiment of the present disclosure.

Optionally, FIG. 9 is a schematic diagram of a dark state display in a naked eye 3D display implemented by a 3D liquid crystal display panel according to an embodiment of the present disclosure. The liquid crystal layer 150 is configured to emit the collimated light incident to the liquid crystal layer 150 in the original propagation direction in a non-operating state, so that the emitted light is irradiated onto the light shielding strip 163 inside the filter unit 161. FIG. 9 is based on the 3D liquid crystal display panel 100 shown in FIG. 6 for example.

Comparing the bright state shown in FIG. 6 and FIG. 8, when the liquid crystal layer 150 is not in operation, that is, the electrode layer 140 does not perform liquid crystal modulation on the liquid crystal layer 150, that is, when no voltage is applied to the first electrode layer 141 and the second electrode layer 142, the propagation direction of the incident collimated light does not change, and the light propagates along a straight line, and is irradiated onto the light shielding strip 163 inside the corresponding filter unit 161, and no light is emitted from the 2D device. At this time, no light is transmitted through the 3D liquid crystal display panel 100 and the display panel is display as a black screen, which realizes a dark state display in the naked eye 3D display.

Based on the 3D liquid crystal display panel 100 according to the embodiments of the present disclosure, an embodiment of the present disclosure also provides a display device including the 3D liquid crystal display panel 100 according to any of the above embodiments of the present disclosure.

The display device according to the embodiment of the present disclosure is, for example, a liquid crystal display, a tablet computer, a television, a mobile phone, a notebook computer, a digital photo frame, or the like, which can perform naked-eye 3D display. For the implementation and the beneficial effects of the display device, reference may be made to the 3D liquid crystal display panel 100 provided by the above embodiments of the present disclosure, and thus no further details are provided herein.

Based on the 3D liquid crystal display panel 100 according to the embodiments of the present disclosure, an embodiment of the present disclosure also provides a driving method, which is performed by the 3D liquid crystal display panel 100 provided by any of the above embodiments of the present disclosure. The driving method according to the embodiment of the present disclosure may include the following steps:

applying voltages to the first electrode layer and the second electrode layer respectively, to form a liquid crystal grating in the liquid crystal layer, so that a collimated light incident to the liquid crystal layer passes through the liquid crystal grating, and then changes direction to pass through the plurality of light transmission regions in the filter unit at different angles, forms monochromatic light and exits from the grating opening of the first grating layer.

In the embodiment of the present disclosure, the structure of the 3D liquid crystal display panel can refer to the 3D liquid crystal display panel provided by any of the above embodiments. That is, the 3D liquid crystal display panel includes: a first substrate and a second substrate disposed opposite to each other to form a cell, and a first grating layer is disposed at a light emitting side of the second substrate for realizing 3D display. The first grating layer includes grating openings 130*a* arranged in an array. An electrode layer, a liquid crystal layer, and a CF layer are sequentially disposed on a side of the first substrate adjacent to the second substrate. The CF layer includes a plurality of filter units arranged in an array, a black matrix disposed between adjacent filter units, and at least one light shielding strip disposed inside each of the filter units and dividing each of the filter units into a plurality of light transmitting regions. The electrode layer includes a first electrode layer and a second electrode layer. Each filter unit corresponds to a sub-pixel of a monochromatic light. In addition, the correspondence between the grating opening and the filter unit has been described in detail in the above embodiments, and therefore will not be repeated here.

Based on the hardware structure of the 3D liquid crystal display panel in the embodiment of the present disclosure, in the process of modulating the liquid crystal layer by applying a voltage to the electrode layer, the propagation direction of the collimated light incident to the liquid crystal layer can be changed, and the light is emitted out at all angles for realizing naked eye 3D display function in combination of the first grating layer. With the same aperture ratio of the grating, the 3D liquid crystal display panel 100 according to the embodiment of the present disclosure can achieve a larger range of the eye box when the naked eye 3D display is implemented. Therefore, the 3D liquid crystal display panel 100 in the embodiment of the present disclosure does not need to expand the range of the eye box of the naked eye 3D display at the expense of reducing the display luminance, and can provide a larger moving range for the human eyes, and allow for longer response time for visual tracking techniques for switching views.

It should be noted that the effect of the driving method according to the embodiment of the present disclosure on the incident collimated light has been described in detail in the above embodiments, and has the same technical effects as the 3D liquid crystal display panel provided in the above embodiments, which will not be repeated here.

Optionally, in the embodiment of the present disclosure, the first electrode layer includes sub-pixel electrodes corresponding to the filter units one by one, and each of the sub-pixel electrodes includes a plurality of first electrodes disposed at intervals. In the above step, applying voltages to the first electrode layer and the second electrode layer respectively to form a liquid crystal grating in the liquid crystal layer may include:

applying the same operating voltage to the first electrodes in each of the sub-pixel electrodes of the first electrode layer, and applying a common voltage to the second electrode layer, to form an arc electric field between each of the first electrodes and the second electrode layer, to drive the liquid crystals in the liquid crystal layer to change the deflection direction, thereby forming a liquid crystal grating.

In the 3D liquid crystal display panel, the display device and the driving method provided by the embodiments of the present disclosure. The 3D liquid crystal display panel according to the embodiment of the present disclosure includes a first substrate and a second substrate disposed opposite to each other to form a cell, and a first grating layer is disposed at a light emitting side of the second substrate for realizing 3D display. The first grating layer includes grating openings arranged in an array. An electrode layer, a liquid crystal layer, and a CF layer are sequentially disposed on a side of the first substrate adjacent to the second substrate. The electrode layer includes a first electrode layer and a second electrode layer. The 3D liquid crystal display panel can apply voltages to the first electrode layer and the second electrode layer respectively, to form a liquid crystal grating in the liquid crystal layer, so that a collimated light incident to the liquid crystal layer passes through the liquid crystal grating and changes the direction to pass through the plurality of light transmitting regions in the filter unit at different angles to form a monochromatic light, and then, is emitted out from the grating openings of the first grating layer. On one hand, based on the structure feature of the light shielding strip disposed inside the filter units of the CF layer, the black matrix and the light shielding strip in the CF layer may increase the area of the visible range at the same brightness, that is, can expand the range of the eye box of the sub-pixel in the 3D liquid crystal display panel, so that the 3D liquid crystal display panel according to the present disclosure does not need to expand the range of the eye box at the expense of reducing the display luminance. That is, it can expand the visible range of the naked eye 3D display device, and at the same time, it can maintain a high display luminance and reserve longer response time for visual tracking technology for switching views.

On the other hand, in the 3D liquid crystal display panel according to the embodiment of the present disclosure, due to the modulation of the electrode layer to the liquid crystal layer, rather than changing the polarization direction of the light, but only the transmission direction of the light is changed, which can ensure that the emitted light can irradiate to the light transmission regions (i.e., the regions having no black matrix and the light shielding strip) of the filter unit as much as possible, and can further improve the light transmittance and the display luminance of the 3D liquid crystal display panel.

While the embodiments of the present disclosure have been described above, the described embodiments are merely for the purpose of understanding the present disclosure and are not intended to limit the present disclosure. Any modification and variation in the form and details of the embodiments may be made by those skilled in the art without departing from the spirit and scope of the present disclosure. The protection scope of the present disclosure is subject to the scope defined by the appended claims.

What is claimed is:

1. A 3D liquid crystal display panel, comprising:
a first substrate and a second substrate disposed opposite to each other to form a cell;
a first grating layer disposed at a light emitting side of the second substrate for realizing 3D display, wherein the first grating layer comprises grating openings arranged in an array;
an electrode layer, a liquid crystal layer, and a color filter CF layer sequentially disposed on a side of the first substrate adjacent to the second substrate, wherein:
the CF layer comprises a plurality of filter units arranged in an array, a black matrix is disposed between adjacent filter units, and at least one light shielding strip is disposed inside each of the filter units and dividing each of the filter units into a plurality of light transmitting regions, each filter unit corresponding to a sub-pixel of a monochromatic light;
the electrode layer comprises a first electrode layer and a second electrode layer, and the 3D liquid crystal display panel is configured to apply voltages to the first electrode layer and the second electrode layer respectively to form a liquid crystal grating in the liquid crystal layer, and a collimated light incident to the liquid crystal layer passes through the liquid crystal grating and changes a direction to pass through the plurality of light transmitting regions in the filter unit at different angles to form a monochromatic light, and is then emitted from the grating openings of the first grating layer;
a second grating layer disposed between the first substrate and the electrode layer, wherein the second grating layer comprises grating units corresponding to the filter units one by one, at least one light extraction grating is disposed in each of the grating units, and the light extraction grating in each of the grating units is disposed in an orthographic projection area of the light shielding strip in the corresponding filter unit in a respective grating unit in a plane in which the second grating layer is located;
the first substrate is configured to perform optical waveguide transmission on a side-entry type incident light in the first substrate; and
the light extraction grating is configured to irradiate the light transmitted in the first substrate onto the liquid crystal layer in a collimated manner.

2. The 3D liquid crystal display panel according to claim 1, wherein in a non-operating state of the liquid crystal layer, the collimated light incident to the liquid crystal layer is exited in the original propagation direction, and irradiated onto the light shielding strip inside the filter unit.

3. The 3D liquid crystal display panel according to claim 1, wherein a center of each of the filter units, and a center of the grating opening through which the monochromatic light emitted from the present filter unit passes, are in one straight line.

4. The 3D liquid crystal display panel according to claim 1, wherein:
the first electrode layer comprises sub-pixel electrodes corresponding to the filter units one by one;
each of the sub-pixel electrodes comprises a plurality of first electrodes disposed at intervals; and
applying voltages to the first electrode layer and the second electrode layer respectively, to form a liquid crystal grating in the liquid crystal layer comprises:
applying a same operating voltage to the first electrodes in each of the sub-pixel electrodes of the first electrode layer, and applying a common voltage to the second electrode layer, to form an arc electric field between each of the first electrodes and the second electrode layer to drive the liquid crystals in the liquid crystal layer to change a deflection direction, thereby forming a liquid crystal grating.

5. The 3D liquid crystal display panel according to claim 1, further comprising: a collimated light source disposed on a side of the first substrate away from the second substrate.

6. The 3D liquid crystal display panel according to claim 1, wherein:
only one light shielding strip is disposed in each filter unit, one or more light extraction gratings are disposed in the grating unit corresponding to the filter unit in the second grating layer, the one or more light extraction gratings are located in the orthographic projection area of the light shielding strip of the filter unit in the plane where the second grating layer is located.

7. The 3D liquid crystal display panel according to claim 1, wherein a plurality of light shielding strips are disposed in each filter unit, the grating unit corresponding to the filter unit in the second grating layer is provided with light extraction gratings corresponding to the light shielding strips one by one, each of the light extraction gratings is located in the orthographic projection area of the light shielding strip corresponding to a respective light extraction grating in the plane where the second grating layer is located.

8. A display device comprising the 3D liquid crystal display panel according to claim 1.

9. A driving method of the 3D liquid crystal display panel according to claim 1, comprising:
applying voltages to the first electrode layer and the second electrode layer respectively, to form a liquid crystal grating in the liquid crystal layer, and to cause a collimated light incident to the liquid crystal layer pass through the liquid crystal grating and changes the direction to pass through the plurality of light transmitting regions in the filter unit at different angles to form a monochromatic light, and then, is emitted out from the grating openings of the first grating layer.

10. The driving method according to claim 9, wherein the first electrode layer comprises sub-pixel electrodes corresponding to the filter units one by one, and each of the sub-pixel electrodes comprises a plurality of first electrodes disposed at intervals, and applying voltages to the first electrode layer and the second electrode layer respectively, to form a liquid crystal grating in the liquid crystal layer comprises:

applying same operating voltage to the first electrodes in each of the sub-pixel electrodes of the first electrode layer, and applying a common voltage to the second electrode layer, to form an arc electric field between each of the first electrodes and the second electrode layer, to drive the liquid crystals in the liquid crystal layer to change a deflection direction, thereby forming a liquid crystal grating.

11. A three-dimensional (3D) liquid crystal display panel, comprising:

a first substrate and a second substrate disposed opposite to each other to form a cell;

a first grating layer disposed at a light emitting side of the second substrate for realizing 3D display, wherein the first grating layer comprises grating openings arranged in an array; and an electrode layer, a liquid crystal layer, and a color filter CF layer sequentially disposed on a side of the first substrate adjacent to the second substrate, wherein:

the CF layer comprises a plurality of filter units arranged in an array, a black matrix is disposed between adjacent filter units, and at least one light shielding strip is disposed inside each of the filter units and dividing each of the filter units into a plurality of light transmitting regions, each filter unit corresponding to a sub-pixel of a monochromatic light;

the black matrix and the light shielding strip are configured to increase the area of the visible range at same brightness, such that an aperture ratio of the grating in the first grating layer is:

$$\frac{\text{width of the sub} - \text{pixel that can be seen by human eye}}{2 * \text{width of the sub} - \text{pixel defined by the filter unit}}; \text{and}$$

the electrode layer comprises a first electrode layer and a second electrode layer, and the 3D liquid crystal display panel is configured to apply voltages to the first electrode layer and the second electrode layer respectively to form a liquid crystal grating in the liquid crystal layer, and a collimated light incident to the liquid crystal layer passes through the liquid crystal grating and changes a direction to pass through the plurality of light transmitting regions in the filter unit at different angles to form a monochromatic light, and is then emitted from the grating openings of the first grating layer.

12. A display device comprising the 3D liquid crystal display panel according to claim 11.

13. A driving method of a three-dimensional (3D) liquid crystal display panel, comprising:

providing the 3D liquid crystal display panel according to claim 11; and applying voltages to the first electrode layer and the second electrode layer respectively to form a liquid crystal grating in the liquid crystal layer, and to cause a collimated light incident to the liquid crystal layer to pass through the liquid crystal grating and change direction to pass through the plurality of light transmitting regions in the filter unit at different angles to form a monochromatic light, and then, emit out from the grating openings of the first grating layer.

14. The driving method according to claim 13, wherein:

the first electrode layer comprises sub-pixel electrodes corresponding to the filter units one by one, each of the sub-pixel electrodes comprises a plurality of first electrodes disposed at intervals, and applying voltages to the first electrode layer and the second electrode layer respectively, to form a liquid crystal grating in the liquid crystal layer comprises:

applying a same operating voltage to the first electrodes in each of the sub-pixel electrodes of the first electrode layer; and applying a common voltage to the second electrode layer to form an arc electric field between each of the first electrodes and the second electrode layer to drive the liquid crystals in the liquid crystal layer to change a deflection direction, thereby forming a liquid crystal grating.

* * * * *